(No Model.)
F. G. OSBORN.
ERASER HOLDER.
No. 377,209. Patented Jan. 31, 1888.
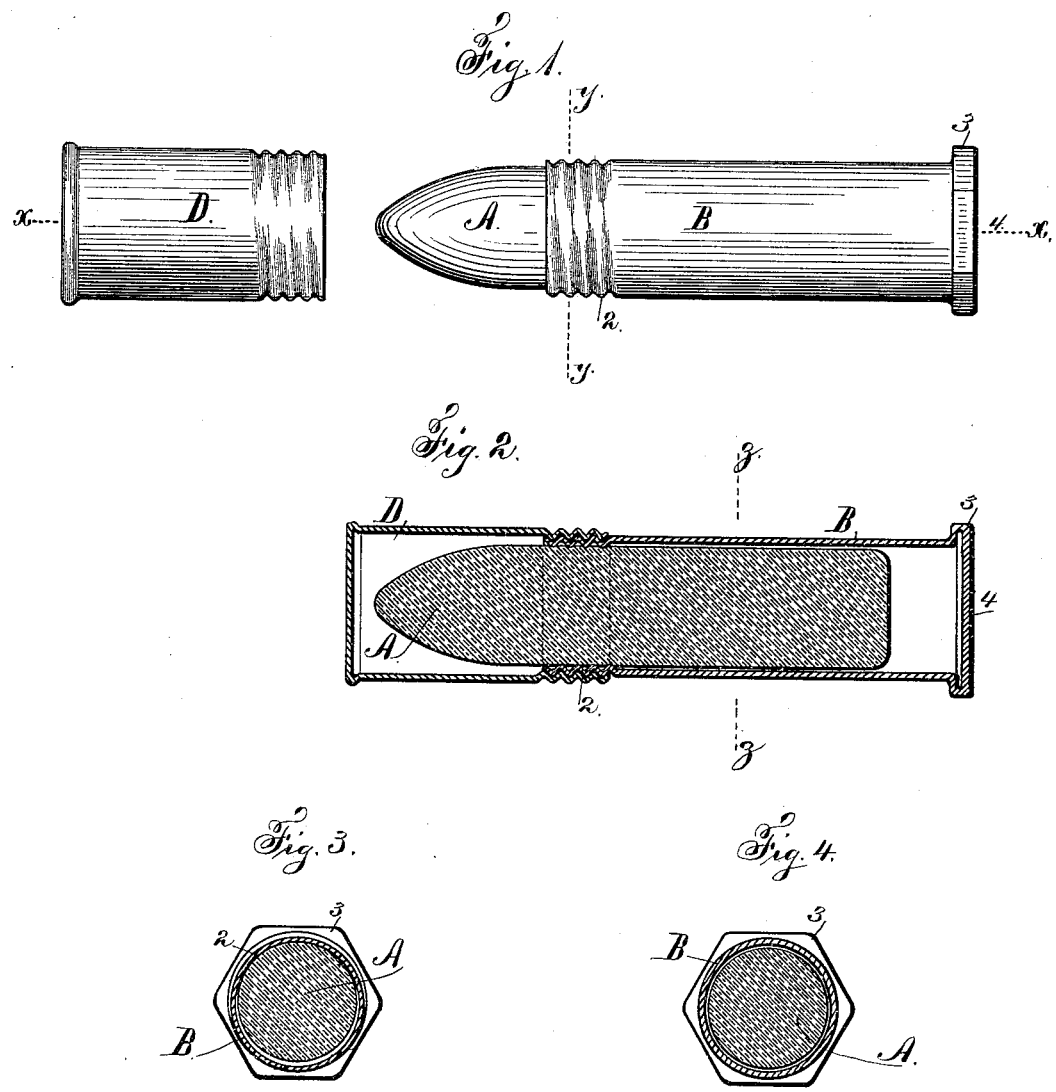
Witnesses
Harold Serrell
Chas H. Smith
Inventor
Frederick G. Osborn
per Lemuel W. Serrell
Atty.

UNITED STATES PATENT OFFICE.

FREDERICK G. OSBORN, OF NEWARK, NEW JERSEY, ASSIGNOR TO EBER-HARD FABER, OF NEW YORK, N. Y.

ERASER-HOLDER.

SPECIFICATION forming part of Letters Patent No. 377,209, dated January 31, 1888.

Application filed October 12, 1887. Serial No. 252,105. (No model.)

*To all whom it may concern:*

Be it known that I, FREDERICK G. OSBORN, of Newark, in the county of Essex and State of New Jersey, have invented an Improvement in Eraser-Holders, of which the following is a specification.

Cylindrical erasing-rubbers have heretofore been made and in some instances the end has been tapering, and small sheet-metal cylinders have been made for connecting the erasing-rubber to pencils, and these sheet-metal cylinders have been screw-threaded. Erasing-rubbers are not well adapted to being handled, especially erasers of large size, because the sulphur of the rubber often comes off on the fingers. Where the erasing-rubber comes into contact with sheet metal, especially when the rubber is tightly pressed against the metal, the rubber is liable to adhere, so that it cannot easily be separated.

My invention is made for preventing the rubber becoming soiled in handling, or preventing the sulphur coming into contact with the fingers, and for preventing the rubber adhering throughout its exterior surface to the metal case inclosing the same.

In the drawings, Figure 1 is an elevation of the eraser and of the case for the same. Fig. 2 is a longitudinal section at the line $x\,x$. Fig. 3 is a cross-section at the line $y\,y$, and Fig. 4 is a cross section at the line $z\,z$.

The erasing-rubber A is a cylindrical plug of the desired diameter, and of a length suitable for handling without the addition of a pencil or separate handle. The case B is a thin sheet-metal tube of a larger diameter than the rubber, so that the rubber does not come into contact with the interior of the plain portion of the tube; hence the rubber will not adhere thereto, even by the lapse of time, because there is no contact or pressure. The tube, however, is reduced in diameter at or near the end by an inwardly-bent screw-thread, as shown at 2, the diameter of the screw-threaded portion being sufficiently small for the screw-thread to press into the rubber and hold the same, so that the rubber is screwed into the case the proper distance to leave the end projecting sufficiently for use, and as the eraser is worn off it is screwed out of the case from time to time, as required. The extent of surface contact between the screw and the rubber being comparatively small, the eraser can be revolved from time to time, the adhesion between the rubber and metal being easily broken.

I prefer to provide a polygonal bead at 3, at the junction of the cylindrical portion of the case, with the closed head 4, so as to prevent the case rolling when laid down; and when the end of the rubber is to be protected from becoming soiled a thin sheet-metal cap, D, with an internal screw-thread fitting the outside of the screw-thread 2, is made use of, so as to be screwed on and off whenever desired.

I do not claim a tubular eraser-holder having a screw-thread bent into the sheet metal and receiving a rubber with a screw-shaped rib or groove, as this has been used, but the entire rounding surface of the rubber within the holder is in contact with the metal and is liable to adhere thereto.

I claim as my invention—

1. A tubular sheet-metal case having an inwardly-bent screw-thread, in combination with the cylindrical eraser screwed into the same, the cylindrical portions of the case being larger than the rubber, so as not to press against the same except at the screw-thread, substantially as set forth.

2. The combination, with a cylindrical erasing-rubber, of a tubular sheet-metal case, with an inwardly-pressed screw-thread to hold the rubber, the cylindrical portion of the case being sufficiently large not to press upon the rubber except at the screw-thread, and a polygonal bead at the end of the cylindrical portion of the case, substantially as set forth.

3. The combination, with the cylindrical erasing-rubber, of a tubular sheet-metal case of larger diameter than the rubber, and having an inwardly-pressed screw-thread for holding the rubber, and a removable sheet-metal cap with an inwardly-pressed screw-thread to screw upon the outside of the sheet-metal case, substantially as set forth.

4. The combination, with the cylindrical erasing-rubber, of a tubular sheet-metal case of larger diameter than the rubber, and having an inwardly-pressed screw-thread for holding the rubber, and a removable sheet-metal cap or cover adapted to fit over the outside of the sheet-metal case, substantially as set forth.

Signed by me this 5th day of October, A. D. 1887.

FREDK. G. OSBORN.

Witnesses:
GEO. T. PINCKNEY,
W. L. SERRELL.